United States Patent
Honda et al.

(10) Patent No.: US 10,384,625 B2
(45) Date of Patent: Aug. 20, 2019

(54) COMMUNICATION DEVICE AND NON-TRANSITORY RECORDING MEDIUM

(71) Applicants: NATIONAL UNIVERSITY CORPORATION NAGOYA UNIVERSITY, Nagoya-shi, Aichi (JP); AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Shinya Honda, Nagoya (JP); Hiroaki Takada, Nagoya (JP); Ryo Kurachi, Nagoya (JP); Hiroshi Ueda, Yokkaichi (JP)

(73) Assignees: National University Corporation Nagoya University, Nagoya-Shi, Aichi (JP); AutoNetworks Technologies, Ltd., Yokkaichi-Shi, Mie (JP); Sumitomo Wiring Systems, Ltd., Yokkaichi-Shi, Mie (JP); Sumitomo Electric Industries, Ltd., Osaka-Shi, Osaka (JP)

( * ) Notice: Subject to any disclaimer, the term of this patent is extended or adjusted under 35 U.S.C. 154(b) by 0 days.

(21) Appl. No.: 15/574,905

(22) PCT Filed: May 17, 2016

(86) PCT No.: PCT/JP2016/064546
§ 371 (c)(1),
(2) Date: Nov. 17, 2017

(87) PCT Pub. No.: WO2016/186093
PCT Pub. Date: Nov. 24, 2016

(65) Prior Publication Data
US 2018/0162295 A1   Jun. 14, 2018

(30) Foreign Application Priority Data
May 18, 2015   (JP) ................................ 2015-100994

(51) Int. Cl.
B60R 16/023 (2006.01)
G06F 12/14 (2006.01)
(Continued)

(52) U.S. Cl.
CPC ............ B60R 16/023 (2013.01); G06F 12/14 (2013.01); H04L 12/28 (2013.01);
(Continued)

(58) Field of Classification Search
CPC ......... G06F 12/14; H04L 12/28; H04L 29/06; H04L 12/4625; B60R 16/023
See application file for complete search history.

(56) References Cited

U.S. PATENT DOCUMENTS 5,790,804 A   8/1998   Osborne
9,262,340 B1 *  2/2016   van Antwerpen ...... G06F 12/14
(Continued)

FOREIGN PATENT DOCUMENTS

JP   H05-173920 A   7/1993
JP   H08-180001 A   7/1996
(Continued)

OTHER PUBLICATIONS

Search Report for PCT/JP2016/064546, dated Jul. 26, 2016.
(Continued)

*Primary Examiner* — Nimesh G Patel
(74) *Attorney, Agent, or Firm* — Honigman LLP

(57) ABSTRACT

Provided are a communication device and a communication restriction program capable of suppressing invalid message transmission to a network by injecting an invalid program. The ECU includes a CAN controller having a register group
(Continued)

storing a value concerning communication with a different ECU and a processing unit processing a value for the register group. The ECU switches the mode between the full control mode in which writing and reading are allowed for the register group in the CAN controller and the restriction mode wherein writing and reading are restricted for a part of the registers in the register group. The ECU sets a predetermined period from activation corresponding to the full control mode, and switches the full control mode to the restriction mode after the predetermined period elapses. After switching to the restriction mode, the ECU will not switch the mode to the full control mode.

12 Claims, 9 Drawing Sheets

(51) Int. Cl.
*H04L 12/28* (2006.01)
*H04L 12/46* (2006.01)
*H04L 29/06* (2006.01)
*H04L 12/40* (2006.01)

(52) U.S. Cl.
CPC .......... *H04L 12/4625* (2013.01); *H04L 29/06* (2013.01); *H04L 2012/40215* (2013.01); *H04L 2012/40273* (2013.01)

(56) References Cited

U.S. PATENT DOCUMENTS

2002/0174168 A1* 11/2002 Beukema ................ H04L 29/06
709/201
2016/0147672 A1* 5/2016 Atzmon .................. G06F 12/14
711/163
2016/0210255 A1* 7/2016 Wicki ................. G06F 13/4022

FOREIGN PATENT DOCUMENTS

JP     2011-103577 A    5/2011
JP     2014-086812 A    5/2014

OTHER PUBLICATIONS

K. Koscher, et al., "Experimental security analysis of a modern automobile," In Proc. of the IEEE Symposium on Security and Privacy, pp. 447-462, 2010.

* cited by examiner

FIG. 2

| ADDRESS | REGISTER NAME | FULL CONTROL MODE | RESTRICTION MODE |
|---|---|---|---|
| 0x000 | MODE REGISTER | R/W:ALLOWED | R:ALLOWED/ W:NOT ALLOWED |
| 0x001~0x004 | TRANSMISSION REQUEST REGISTER 1~4 | R/W:ALLOWED | R/W:PARTLY ALLOWED |
| 0x005~0x008 | TRANSMISSION CANCEL REGISTER 1~4 | R/W:ALLOWED | R/W:PARTLY ALLOWED |
| 0x009~0x00C | TRANSMISSION COMPLETE REGISTER 1~4 | R:ALLOWED | R:PARTLY ALLOWED |
| 0x00D~0x010 | TRANSMISSION CANCEL COMPLETE REGISTER 1~4 | R:ALLOWED | R:PARTLY ALLOWED |
| 0x011~0x014 | RECEPTION COMPLETE REGISTER 1~4 | R:ALLOWED | R:PARTLY ALLOWED |
| 0x015~0x018 | TRANSMISSION MESSAGE STORING REGISTER 1~4 | R/W:ALLOWED | R/W:PARTLY ALLOWED |
| 0x019~0x01C | TRANSMISSION PERMISSION SETTING REGISTER 1~4 | R/W:ALLOWED | R/W:NOT ALLOWED |
| 0x01D~0x020 | TRANSMISSION CYCLE SETTING REGISTER 1~4 | R/W:ALLOWED | W:NOT ALLOWED |
| 0x021~0x024 | TRANSMISSION IDENTIFICATION INFORMATION SETTING REGISTER 1~4 | R/W:ALLOWED | R/W:NOT ALLOWED |
| 0x025~0x028 | RECEPTION MESSAGE STORING REGISTER 1~4 | R:ALLOWED | R:PARTLY ALLOWED |
| 0x029~0x02C | RECEPTION PERMISSION SETTING REGISTER 1~4 | R/W:ALLOWED | W:NOT ALLOWED |
| 0x02D~0x030 | RECEPTION IDENTIFICATION INFORMATION SETTING REGISTER 1~4 | R/W:ALLOWED | R/W:NOT ALLOWED |

COMMUNICATION DEVICE AND NON-TRANSITORY RECORDING MEDIUM

CROSS-REFERENCE TO RELATED APPLICATIONS

This application is the national phase under 35 U.S.C. § 371 of PCT International Application No. PCT/JP2016/064546 which has an International filing date of May 17, 2016 and designated the United States of America, which claims priority to Japanese Application No. JP2015-100994 filed on May 18, 2015.

FIELD

The present disclosure relates to a communication device and a communication restriction program for preventing transmission of an invalid message to a network.

BACKGROUND

In recent years, electronic control units (ECUs) mounted to a vehicle have advanced functions, and programs executed in the ECUs are more complicated accordingly.

Moreover, multiple ECUs are mounted to a vehicle and are connected with each other via a network such as a controller area network (CAN). The multiple ECUs perform processing while exchanging information through the network.

Japanese Patent Application Laid-Open Publication No. 2014-86812 describes a CAN system that aims to enhance fault tolerance by transmitting a retransmission request frame in the case where the first node in the CAN system fails to receive a frame and is in an error passive state, storing by the second node a frame transmitted to a CAN bus, and retransmitting the frame for which retransmission is requested to the first node.

Japanese Patent Application Laid-Open Publication No. 2011-103577 describes a communication system that aims to prevent erroneous operation on the reception side of a frame by having such a configuration that a CAN controller measures transmission latency from the input of a frame to the start of transmission to the CAN bus and transmits the frame together with information related to the transmission latency, while deciding processing to be executed in accordance with the transmission latency by the CAN controller which received the frame.

SUMMARY

K. Koscher, A. Czeskis, F. Roesner, S. Patel, T. Kohno, S. Checkoway, D. McCoy, B. Kantor, D. Anderson, H. Shacham, and S. Savage. Experimental security analysis of a modern automobile. In Proc. of the IEEE Symposium on Security and Privacy, pages 447-462, 2010, however, reports that an invalid message may be transmitted to a network in a vehicle by injecting an invalid program to the ECU.

Transmission of an invalid message based on an invalid program may cause erroneous operation in a different ECU connected to the network. For such invalid message transmission, neither the CAN system according to Japanese Patent Application Laid-Open Publication No. 2014-86812 nor the communication system according to Japanese Patent Application Laid-Open Publication No. 2011-103577 could present an effective measure.

The present disclosure has been made in view of the above circumstances, and aims to provide a communication device and a communication restriction program capable of suppressing invalid message transmission to a network caused by injecting an invalid program.

In the communication device according to an aspect of the present disclosure comprising a communication unit including a plurality of registers in which a value concerning communication with a different device is stored and a processing unit performing communication processing by writing and reading a value for a register in the communication unit, writing or reading of a value for a part of the multiple registers is restricted.

Moreover, in the communication device according to another aspect of the present disclosure, further comprising a switching unit for performing switching between a first mode in which writing and reading of a value for the plurality of registers are allowed and a second mode in which writing or reading of a value for a part of the plurality of registers is restricted.

Moreover, in the communication device according to another aspect of the present disclosure, wherein the switching unit is configured not to perform switching from the second mode to the first mode after performing switching from the first mode to the second mode.

Moreover, in the communication device according to another aspect of the present disclosure, wherein the switching unit is configured to set in the first mode for a predetermined period from activation of the communication device, to perform switching from the first mode to the second mode after the predetermined period elapses, and not to perform switching from the second mode to the first mode after the switching from the first mode to the second mode.

Moreover, in the communication device according to another aspect of the present disclosure, further comprising a storage unit in which a program for writing a value into a register restricted from writing in the second mode is stored, wherein the processing unit executes the program after activation of the communication device, and the switching unit is configured to perform switching while setting a period during which the program is executed by the processing unit as the predetermined period.

Moreover, in the communication device according to another aspect of the present disclosure, wherein the plurality of registers include a plurality of transmission message storing registers in which a message to be transmitted by the communication unit to a different device is stored, and writing is restricted for one or more of the transmission message storing registers of the plurality of transmission message storing registers in the second mode.

Moreover, in the communication device according to another aspect of the present disclosure, wherein the plurality of registers include a transmission cycle setting register for storing setting of a cycle at which the communication unit transmits a message stored in the transmission message storing register, and the communication device further comprises a regulation unit regulating message transmission at a cycle shorter than the cycle set and stored in the transmission cycle setting register.

Moreover, in the communication device according to another aspect of the present disclosure, wherein the message contains identification information for identifying the message, the plurality of registers include an identification information setting register for storing setting for the identification information permitting storage into the transmission message storing register, and the communication device further comprises a restriction unit restricting storage of a message other than identification information stored in the identification information setting register into the transmission message storing register.

Moreover, in the communication device according to another aspect of the present disclosure, further comprising an operation accepting unit accepting operation concerning switching between the first mode and the second mode, wherein the switching unit is configured to perform switching in accordance with the operation accepted by the operation accepting unit.

Moreover, in the communication device according to another aspect of the present disclosure, further comprising a connection unit to be connected with an external device, wherein the operation accepting unit is configured to accept, via the connection unit, operation performed for the external device connected with the connection unit.

Moreover, in the communication device according to another aspect of the present disclosure, further comprising an authentication processing unit performing authentication processing between the communication device and the external device connected with the connection unit, wherein the operation accepting unit is configured to accept operation in a case where the authentication processing by the authentication processing unit succeeds.

Moreover, in the communication device according to another aspect of the present disclosure, comprising a communication unit having a plurality of registers in which a value concerning communication with a different device is stored; and a processing unit performing communication processing by writing and reading a value for the registers in the communication unit, further comprising a switching unit performing switching between a first mode in which writing and reading of a value for the plurality of registers are allowed and a second mode in which writing or reading of a value for a part of the plurality of registers are restricted, wherein the processing unit is configured to write a value into a register restricted from writing in the second mode, and to cause the switching unit to perform switching from the first mode to the second mode after writing of the value into the register.

Moreover, in the non-transitory recording medium according to another aspect of the present disclosure, in which a communication restriction program is recorded, the communication restriction program causing a communication device, comprising: a communication unit having a plurality of registers in which a value concerning communication with a different device is stored; a processing unit performing communication processing by writing and reading a value for the registers in the communication unit; and a switching unit switching between a first mode in which writing and reading of a value for the plurality of registers are allowed and a second mode in which writing or reading of a value for a part of the plurality of registers is restricted, to: write a value into a register restricted from writing in the second mode; and cause the switching unit to switch from the first mode to the second mode after writing a value into the register.

According to the present disclosure, the communication device comprises a communication unit having a plurality of registers in which a value concerning communication with a different device is stored, and a processing unit performing communication processing by writing and reading a value for the registers. For example, in the case of the communication device performing communication in accordance with the CAN protocol, a CAN controller may be employed as the communication unit while a central processing unit (CPU) may be employed as the processing unit. Application of the present disclosure is, however, not limited to the CAN protocol, and the present disclosure may also be applied to various other communication protocols with or without wires.

According to an aspect of the present disclosure, switching is performed between the first mode in which writing and reading to the registers in the communication unit are allowed and the second mode in which writing and reading to a part of the registers are restricted. A predetermined period from the activation of the communication device is set as the first mode, which is switched to the second mode after the predetermined period elapses. After switching to the second mode, the mode will not be switched to the first mode.

Accordingly, after a predetermined period elapses after the activation of the communication device, writing and reading for a part of the registers in the communication unit are restricted. By restricting the use of a resource related to such communication, invalid use of a communication resource based on an invalid program injected into the communication device may be restricted.

According to another aspect of the present disclosure, a communication device comprises a first storage unit in which a first program executed by the processing unit after activation of the communication device is stored and a second storage unit in which a second program executed by the processing unit after execution of the first program is stored. The switching between the first mode and the second mode is performed while a period during which the processing unit executes the first program is set as the predetermined period. That is, the first program is executed in the first mode whereas the second program is executed in the second mode. This can restrict the operation in the first mode having no restrictions in the use of the register in the communication unit to the execution period of the first program stored in the first storage unit. Even if an invalid program is injected into the second storage unit, the invalid program stored in the second storage unit is executed in the second mode which restricts the use of the register in the communication unit.

According to a further aspect of the present disclosure, the first storage unit is so configured that the stored content cannot be rewritten. For example, the first storage unit is configured using a non-rewritable memory element such as a mask ROM (Read Only Memory). This makes it impossible to inject an invalid program into the first storage unit, preventing the invalid program from being executed in the first mode.

According to another aspect of the present disclosure, execution of the first program sets to decide which register is to be restricted from writing and reading in the second mode. Accordingly, a register restricted from being used in the second mode may be set to accommodate the processing details of its own device while enhancing versatility of a communication unit by making variable the register restricted from being used.

According to another aspect of the present disclosure, the multiple registers in the communication unit include multiple transmission message storing registers for storing a message to be transmitted to a different device. The processing unit may store the message to be transmitted to a different device into the transmission message storing register in the communication unit to transmit the message. In the second mode, writing and reading for one or more of the transmission message storing registers are restricted. This can restrict the use of the transmission message storing register based on an invalid program, and thus can restrict invalid message transmission.

According to another aspect of the present disclosure, the multiple registers in the communication unit include a transmission cycle setting register for storing setting of a cycle in which the communication unit transmits the message stored in the transmission message storing register. The message transmission by the communication unit is restricted so as not to be performed at a cycle shorter than the cycle set by the transmission cycle setting register, and thus may only be performed at a cycle longer than the set cycle. Accordingly, the minimum cycle for the message transmission by the communication device may be defined, which can prevent an invalid program from repeating frequent message transmission at a cycle shorter than the minimum cycle.

According to another aspect of the present disclosure, a message transmitted and received by the communication device includes identification information for identifying the message. The identification information may be a CAN-ID attached to the message in the CAN protocol, for example. The multiple registers in the communication unit include an identification information setting register for storing the setting related the identification information of a message which is permitted to be stored in the transmission message storing register. Storing of a message in the transmission message storing register in the communication unit is limited only to a message attached with the identification information set in the identification information setting register, and storing of any message attached with the other identification information is restricted. This can restrict the type of a message to be transmitted by the communication device based on the identification information, thereby preventing transmission of a message attached with invalid identification information by an invalid program.

According to another aspect of the present disclosure, in the case where the operation of mode switching is explicitly performed, the switching is performed between the first mode and the second mode. This allows for writing of a value into a register in testing, manufacturing, maintenance or the like of a vehicle, for example.

According to another aspect of the present disclosure, a connection part is provided that is capable of connecting an external device to the communication device. The external device includes an operation unit such as a switch or touch panel, which may be used in operation related to mode switching in the communication device. The communication device accepts the operation performed at the external device through the connection part, and performs mode switching in accordance with the accepted operation.

According to another aspect of the present disclosure, authentication processing is performed between the communication device and an external device. The communication device accepts the operation related to mode switching only when the authentication processing succeeds. This makes it difficult to rewrite the value of a register by an external device connected to the connection part.

According to an aspect of the present disclosure, restriction on the use of a register in a communication unit which transmits/receives a message to/from a different device can suppress invalid message transmission to a network that may have otherwise been performed by injecting an invalid program.

The above and further objects and features will more fully be apparent from the following detailed description with accompanying drawings.

BRIEF DESCRIPTION OF THE DRAWINGS

FIG. 2 is a schematic view illustrating a configuration example of a register group.

DETAILED DESCRIPTION

Embodiment 1

Figure 1:
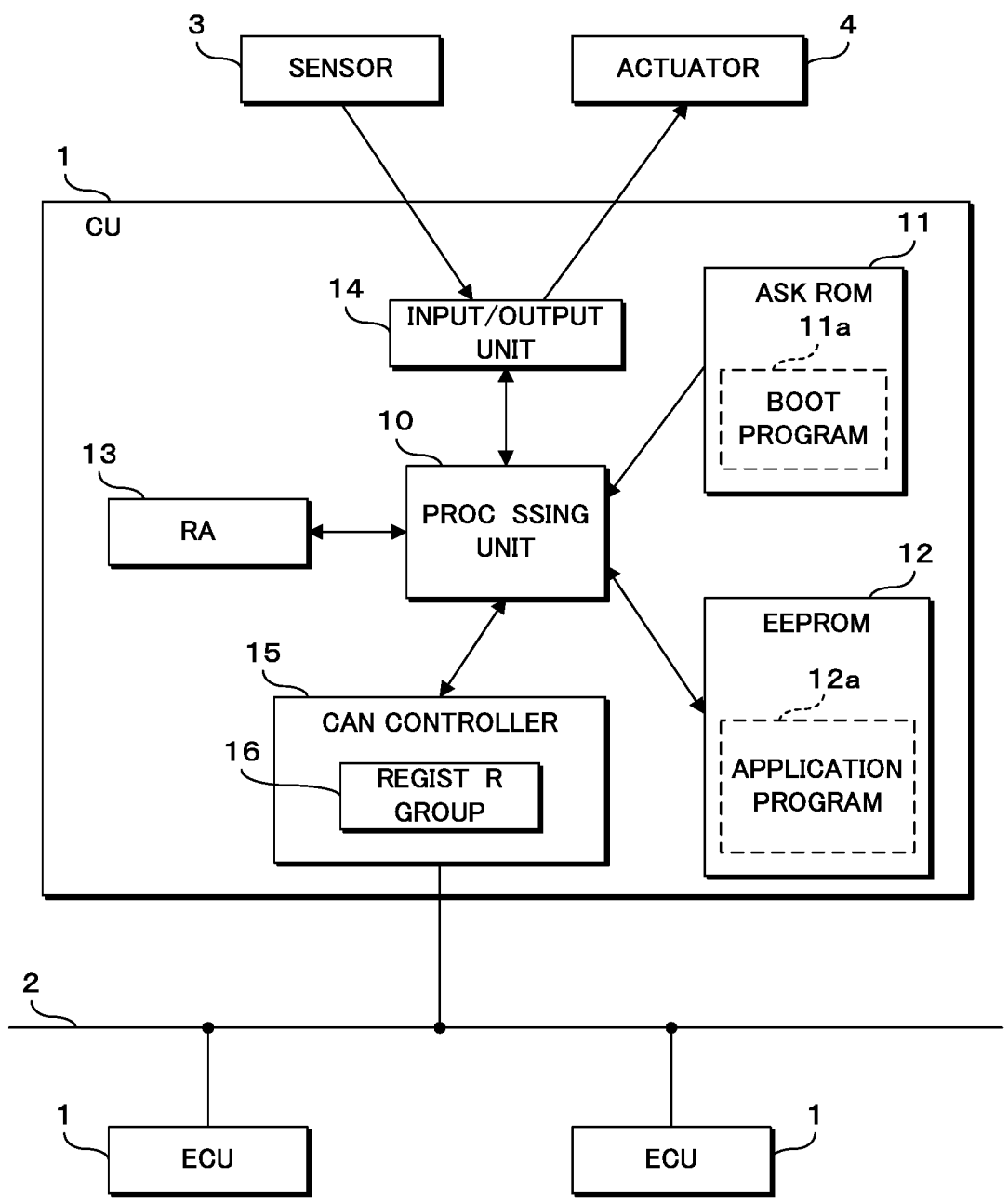
FIG. 1 is a block diagram illustrating the configuration of a communication system according to an embodiment of the present disclosure.

The present disclosure will specifically be described below with reference to the drawings illustrating the embodiments thereof. FIG. 1 is a block diagram illustrating the configuration of a communication system according to the present embodiment. The communication system according to the present embodiment is so configured that multiple ECUs (communication devices) 1 mounted to a vehicle (not illustrated) are connected to a CAN bus 2 through which the ECUs 1 communicate with each other. Since the ECUs 1 have substantially the same configuration regarding the communication function, one ECU 1 is illustrated in detail in FIG. 1 while the other ECUs 1 are not illustrated in detail.

The ECU 1 is configured to include a processing unit (processor) 10, a mask ROM (first storage unit) 11, an EEPROM (second storage unit) 12, a RAM 13, an input/output unit 14, a CAN controller (communication unit, transceiver) 15 and so forth. The processing unit 10 is configured with an arithmetic processing device such as a central processing unit (CPU) or a micro-processing unit (MPU). The processing unit 10 reads out and executes a boot program 11*a* stored in the mask ROM 11 and an application program 12*a* stored in the EEPROM 12 to perform various arithmetic processing, control processing and so forth.

The mask ROM 11 is a non-volatile memory element which cannot rewrite stored information (such as program and data). According to the present embodiment, the boot program 11*a* to be executed by the processing unit 10 is pre-stored in the mask ROM 11. The boot program 11*a* is a program executed first by the processing unit 10 after the ECU 1 is activated. The processing unit 10 executes the boot program 11*a* to perform processing of, for example, initialization of the resource and setting for operating conditions for the hardware and software included in the ECU 1. Activation of the ECU 1 includes, for example, that power supply to the ECU 1 is started and, for example, power-on reset is released, to start the operation at various units, and that the user operates a reset switch to initialize the operation of the ECU 1 and then the reset is released to start (so-called restart) the operation at various units.

The EEPROM 12 is a non-volatile memory element capable of rewriting data. According to the present embodiment, the application program 12*a* to be executed by the processing unit 10 is stored in the EEPROM 12. The application program 12a is a program for performing processing to implement a function specific to each ECU 1. A part or whole of the program may be rewritten by version upgrade or defect correction, for example. After activation, the processing unit 10 performs processing for the boot program 11a, and thereafter performs processing for the application program 12a.

The RAM 13 is a volatile memory element such as a static random access memory (SRAM) or a dynamic random access memory (DRAM), for example. The RAM 13 temporarily stores therein various types of data generated in the course of processing performed by the processing unit 10.

The input/output unit 14 accepts a signal input from, e.g., various types of sensors 3 and the like mounted to a vehicle, outputs a control signal or the like to various types of actuators 4, and so forth. The input/output unit 14 is connected to the sensor 3, actuator 4 and the like via signal lines through which signals are input and output. The input/output unit 14 samples an analog input signal from the sensor 3, for example, converts the signal into digital data and sends it to the processing unit 10. Moreover, the input/output unit 14 outputs a control signal to the actuator 4 in accordance with a control command sent from the processing unit 10. It is not always necessary for the ECU 1 to include both functions of signal input and signal output between the ECU 1 and the sensor 3, actuator 4 or the like, but may include only one of the input and output functions, or may include none of the input and output functions.

The CAN controller 15 transmits and receives a message via the CAN bus 2 to/from a different ECU 1 mounted to the vehicle in accordance with the control of the processing unit 10. The CAN controller 15 outputs, for example, a transmission message sent from the processing unit 10 to the CAN bus 2 as a binary signal of dominant/recessive according to the CAN protocol, to transmit the message. The CAN controller 15 obtains a signal on the CAN bus 2 by sampling the potential on the CAN bus 2, to receive the message. The processing unit 10 may obtain the message received by the CAN controller 15 to perform processing. Furthermore, the CAN controller 15 detects collision of messages transmitted to the CAN bus 2, arbitrates the order of message transmission if collision occurs, and so forth.

The CAN controller 15 according to the present embodiment further includes a register group 16. FIG. 2 is a schematic view illustrating a configuration example of the register group 16. The register group 16 included in the CAN controller 15 according to the present embodiment includes multiple registers such as a mode register, transmission request registers 1-4, transmission cancel registers 1-4, transmission complete registers 1-4, transmission cancel complete registers 1-4, reception complete registers 1-4, transmission message storing registers 1-4, transmission permission setting registers 1-4, transmission cycle setting registers 1-4, transmission identification information setting registers 1-4, reception message storing registers 1-4, reception permission setting registers 1-4, and reception identification information setting registers 1-4, for example. The registers illustrated in FIG. 2 are mere examples and the registers are not limited thereto. The CAN controller 15 may also include various other registers not illustrated here or may exclude some of the illustrated registers. In FIG. 2, the registers for which reading is possible is indicated as "R: ALLOWED," those for which reading and writing are possible are indicated as "R/W: ALLOWED," and those for which neither reading nor writing is possible are indicated as "R/W: NOT ALLOWED."

For the register group 16 in the CAN controller 15, a one-dimensional address is attached to each register. In the illustrated example, addresses of 0x000 to 0x030 in the hexadecimal system are attached to the respective registers. The processing unit 10 may send a reading command to the CAN controller 15 while designating an address, so as to read out a value stored in the register designated by the address. The processing unit 10 may further send a writing command to the CAN controller 15 while designating an address and data, so as to write data into the register designated by the address. According to the present embodiment, however, in the case where only reading of a value is permitted for a register and where neither reading nor writing is permitted for a register, the CAN controller 15 notifies the processing unit 10 of an error for the reading command or writing command sent to such a register.

Moreover, the CAN controller 15 according to the present embodiment operates in two types of operation modes, i.e. a full control mode and a restriction mode. The full control mode is a mode in which the processing unit 10 may access all the registers in the register group 16 (read from a register for which only reading is allowed, or read from and write into a register for which reading and writing are allowed). The restriction mode is, on the other hand, a mode in which access to a part of the registers in the register group 16 by the processing unit 10 is restricted (is made impossible) and only a permitted register may be accessed. Immediately after activating the ECU 1, i.e. immediately after activating the CAN controller 15, the CAN controller 15 operates in the full control mode.

The mode register in the register group 16 is a register for switching the operation mode of the CAN controller 15. By the processing unit 10 writing a predetermined value into the mode register, the operation mode of the CAN controller 15 is switched from the full control mode to the restriction mode. Moreover, in the restriction mode, no value may be written into the mode register. The processing unit 10 may switch the operation mode of the CAN controller 15 from the full control mode to the restriction mode, but not from the restriction mode to the full control mode.

The CAN controller 15 has four registers (transmission message storing registers 1-4) for storing messages to be transmitted to other ECUs 1. The processing unit 10 may write a message into any one of the transmission message storing registers 1-4 and further write a transmission request into a corresponding one of the transmission request registers 1-4, to cause the registers to transmit the message to the CAN controller 15. The processing unit 10 may write a cancel request into a corresponding one of the transmission cancel registers 1-4, to cancel transmission before the message is transmitted.

The transmission complete registers 1-4 and the cancel complete registers 1-4 in the register group 16 are registers into which values are written by the CAN controller 15. The CAN controller 15 transmits a message in accordance with a transmission request from the processing unit 10, and if the transmission is completed, writes a value indicating that the transmission is completed into a corresponding one of the transmission complete registers 1-4. Moreover, the CAN controller 15 interrupts message transmission in accordance with the cancel request from the processing unit 10, and if the interruption succeeds, writes a value indicating that the cancel is completed into one of the cancel complete registers 1-4. If, however, the interruption of message transmission fails, the CAN controller 15 writes a value indicating that the cancel fails into one of the cancel complete registers 1-4. The processing unit 10 reads out the values of the transmission complete registers 1-4 and the cancel complete registers 1-4, to confirm processing results for the transmission request and the cancel request.

Moreover, as to the four transmission message storing registers 1-4 in the present embodiment, the processing unit 10 may use all of them at the operation in the full control mode, whereas a part of them is restricted from being used at the operation in the restriction mode. The transmission permission setting registers 1-4 in the register group 16 are registers for storing setting on whether or not the use in the restriction mode is permitted for each of the transmission message storing registers 1-4. While the CAN controller 15 operates in the full control mode, the processing unit 10 writes into any one of the transmission permission setting registers 1-4 a value indicating that the use of the register is not permitted, to make it impossible to read from and write into a corresponding one of the transmission message storing registers 1-4 after switching to the restriction mode. For the transmission permission setting registers 1-4, reading and writing are allowed in the full control mode, while reading and writing are not allowed in the restriction mode, and the setting cannot be changed.

For example, the ECU 1 according to the present embodiment writes information indicating that the use is permitted into the transmission permission setting register 1, and writes information indicating that the use is not permitted into the transmission permission setting registers 2-4. After the mode is switched from the full control mode to the restriction mode, the ECU 1 can transmit a message using the transmission message storing register 1 but can not transmit a message using the transmission message storing registers 2-4.

Furthermore, in the present embodiment, the CAN controller 15 determines a cycle, at which a message stored in the transmission message storing registers 1-4 is transmitted, for each of the transmission message storing registers 1-4. The CAN controller 15 does not accept a transmission request from the processing unit 10 related to the corresponding one of the transmission message storing registers 1-4 after the previous message transmission is finished until a predetermined period of time (minimum transmission interval) elapses. The transmission cycle setting registers 1-4 in the register group 16 are registers for storing setting of a transmission cycle as the predetermined period for each of the transmission message storing registers 1-4. While the CAN controller 15 operates in the full control mode, the processing unit 10 writes into any one of the transmission cycle setting registers 1-4 the setting of the transmission cycle, to implement restriction of message transmission based on the transmission cycle as described above. It is noted that the CAN controller 15 may restrict message transmission based on the transmission cycle which is set irrespective of the operation mode, or may restrict message transmission only in the restriction mode. For the transmission cycle setting registers 1-4, reading and writing are allowed in the full control mode, while writing is not allowed in the restriction mode, and the setting cannot be changed. The transmission cycle setting registers 1-4 may also be configured to restrict not only writing but also reading in the restriction mode.

For example, the ECU 1 according to the present embodiment writes such setting of the transmission cycle as being 100 ms into the transmission cycle setting register 1. In the case where the use of the transmission message storing registers 2-4 is not permitted, no setting is needed for the transmission cycle setting registers 2-4. After being switched to the restriction mode, the CAN controller 15 measures the time elapsed from the transmission by an internal timer function every time transmission is performed, and does not accept a transmission request from the processing unit 10 until the set cycle of 100 ms elapses from the previous message transmission. It is noted that the CAN controller 15 may measure elapsed time individually for each of the transmission message storing registers 1-4.

Furthermore, in the present embodiment, a CAN-ID of a message that can be stored in each of the four transmission message storing registers 1-4 may be determined for each of the transmission message storing registers 1-4. In the case where a request for writing a message into one of the transmission message storing registers 1-4 is sent from the processing unit 10, only if the CAN-ID contained in the message is a CAN-ID defined for the one of the transmission message storing registers 1-4 into which the message is to be written, the message sent from the processing unit 10 is written into the one of the transmission message storing registers 1-4. The transmission identification information setting registers 1-4 in the register group 16 are registers for storing setting of CAN-IDs for the messages that can be stored in the corresponding transmission message storing registers 1-4. While the CAN controller 15 operates in the full control mode, the processing unit 10 writes into any one of the transmission cycle setting registers 1-4 the setting of CAN-ID, to implement restriction of message storing based on the CAN-ID as described above. It is noted that the CAN controller 15 may restrict message storing based on the CAN-ID which is set irrespective of the operation mode, or may restrict message storing only in the restriction mode. For the transmission identification information setting registers 1-4, reading and writing are allowed in the full control mode, while reading and writing are not allowed in the restriction mode, and the setting cannot be changed.

For example, the ECU 1 according to the present embodiment writes the value of "0010" into the transmission identification information setting register 1 as the CAN-ID. In the case where the use of the transmission message storing registers 2-4 is not permitted, no setting is needed for the transmission identification information setting registers 2-4. After being switched to the restriction mode, in the case where a request for writing a message into the transmission message storing register 1 is sent from the processing unit 10, the CAN controller 15 stores a message in the transmission message storing register 1 only if the CAN-ID attached to the message is "0010."

The CAN controller 15 has four registers (reception message storing registers 1-4) for storing messages received from other ECUs 1. If a message is received from a different ECU 1, the CAN controller 15 writes the message into one of the reception message storing registers 1-4 while writing information indicating that the reception is completed into a corresponding one of the reception complete registers 1-4. The processing unit 10 reads out a value from one of the reception complete registers 1-4 on a regular basis and checks the value, to determine whether or not a message is received from a different ECU 1, and if a message is received, may read out the message from the corresponding one of the reception message storing registers 1-4.

Moreover, as to the four reception message storing registers 1-4 in the present embodiment, the processing unit 10 may use all of them at the operation in the full control mode, whereas a part of them is restricted for use at the operation in the restriction mode. The reception permission setting registers 1-4 in the register group 16 are registers for storing setting on whether or not the use in the restriction mode is permitted for each of the reception message storing registers 1-4. A value indicating that the use of the register is not permitted is written into any one of the reception permission setting registers 1-4 while the CAN controller 15 operates in the full control mode, to make it impossible to read from and write into a corresponding one of the reception message storing registers 1-4 after switching to the restriction mode. For the reception permission setting registers 1-4, reading and writing are allowed in the full control mode, while writing is not allowed and the setting cannot be changed in the restriction mode. The reception permission setting registers 1-4 are configured to restrict not only writing but also reading in the restriction mode.

For example, the ECU 1 according to the present embodiment writes into the reception permission setting registers 1, 2 information indicating that the use of the registers 1, 2 is permitted, and writes into the reception permission setting registers 3, 4 information indicating that the use of the registers 3, 4 is not permitted. After the mode is switched from the full control mode to the restriction mode, the ECU 1 may receive a message using the reception message storing registers 1, 2 but not the reception message storing registers 3, 4.

Furthermore, in the present embodiment, the CAN-ID of a message that can be stored in the four reception message storing registers 1-4 may be determined for each of the message storing registers 1-4. In the case where a message is received from a different ECU 1, only if the CAN-ID contained in the received message is a CAN-ID defined for one of the reception message storing registers 1-4, the CAN controller 15 writes the message into the corresponding one of the reception message storing registers 1-4. The reception identification information setting registers 1-4 in the register group 16 are registers for setting a CAN-ID for the message that can be stored in the corresponding one of the reception message storing registers 1-4. While the CAN controller 15 operates in the full control mode, the processing unit 10 writes the setting of CAN-ID into any one of the reception identification information setting registers 1-4, to implement restriction of message storing based on the CAN-ID as described above. It is noted that the CAN controller 15 may restrict message storing based on the CAN-ID which is set irrespective of the operation mode, or may restrict message storing only in the restriction mode. For the reception identification information setting registers 1-4, reading and writing are allowed in the full control mode, while reading and writing are not allowed in the restriction mode, and the setting cannot be changed.

For example, the ECU 1 according to the present embodiment writes the value of "0012" into the reception identification information setting register 1 as the CAN-ID, and the value of "0020" into the reception identification information setting register 2. In the case where the use of the reception message storing registers 3, 4 is not permitted, no setting is needed for the reception identification information setting registers 3, 4. After being switched to the restriction mode, the CAN controller 15 stores the message into the reception message storing registers 1, 2 only if the CAN-ID contained in the reception message is "0012" or "0020." If a message with a CAN-ID other than the ones described above is received, the CAN controller 15 discards the received message.

As such, the CAN controller 15 according to the present embodiment restricts access to the register group 16 in the restriction mode. Immediately after activating the ECU 1, the CAN controller 15 starts the operation in the full control mode. Here, the processing unit 10 reads out and executes the boot program 11a stored in the mask ROM 11. The processing unit 10 executing the boot program 11a here may access the register group 16 in the CAN controller 15 without any restriction. The boot program 11a is a program for initial setting of the ECU 1, and the processing unit 10 executes the program to set conditions for access restriction to the register group 16 in the CAN controller 15. That is, the processing unit 10 executes the boot program 11a to set the availability of the transmission message storing registers 1-4 for the transmission permission setting registers 1-4, to set transmission cycles for the transmission cycle setting registers 1-4, to set CAN-IDs for the transmission identification information setting registers 1-4, to set the availability of the reception message storing registers 1-4 for the reception permission setting registers 1-4, to set CAN-IDs for the reception identification information setting registers 1-4, and so forth.

After the setting for these registers are finished, the processing unit 10 which executes the boot program 11a writes a value into a mode register to switch the operation mode of the CAN controller 15 from the full control mode to the restriction mode. After the switching to the restriction mode is completed, the processing unit 10 terminates the execution of the boot program 11a, and starts executing the application program 12a stored in the EEPROM 12. During execution of the application program 12a, the CAN controller 15 operates in the restriction mode, so that access to the register group 16 is restricted. After being switched to the restriction mode, the CAN controller 15 cannot switch the mode to the full control mode. Only in the case where, for example, power is restored after the ECU 1 is once turned off, or where the ECU 1 is restarted by reset operation or the like, the CAN controller 15 may be in the full control mode.

Thus, the boot program 11a may appropriately be prepared in advance to set the conditions for access restriction to the register group 16 so that a register necessary for executing the application program 12a is available and a register unnecessary for such execution is not available.

While it is configured in the present embodiment that the processing unit 10 writes a value into a mode register to cause the CAN controller 15 to switch the operation mode from the full control mode to the restriction mode, the configuration is not limited thereto. It may also be configured that, for example, the CAN controller 15 measures the time elapsed from activation (e.g., number of clocks), and if a predetermined time elapses, the operation mode is forcibly switched from the full control mode to the restriction mode even if the processing unit 10 does not perform writing to the mode register. In this case, for example, a time period required for executing the boot program 11a may be set as the predetermined time used as criteria for switching. The predetermined time may, however, be decided irrespective of the execution time for the boot program 11a, in which case the predetermined time until mode switching will serve as a restriction condition for preparation of the boot program 11a.

Figure 3:
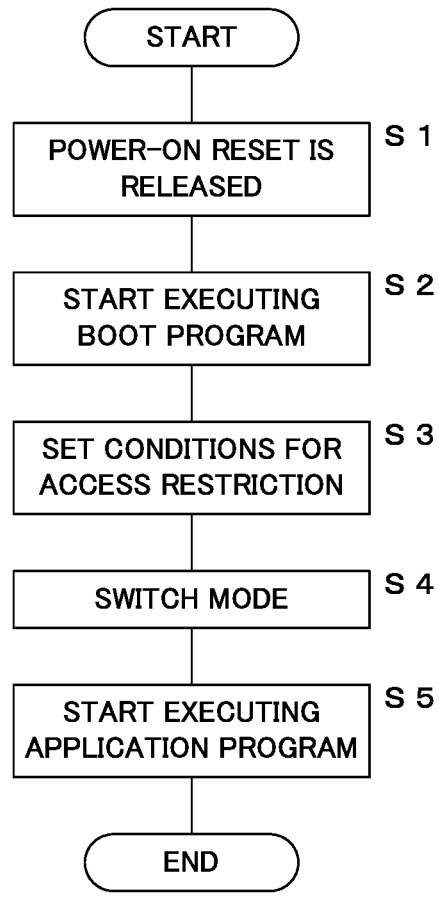
FIG. 3 is a flowchart illustrating a procedure of processing performed by the processor in an ECU.

FIG. 3 is a flowchart illustrating a procedure of processing performed at the time of activation by the processing unit 10 in an ECU 1. The processing unit 10 in the ECU 1 according to the present embodiment activates or reactivates the ECU 1 to perform power-on reset by a reset IC, for example, and thereafter the power-on reset is released (step S1) to start the processing. First, the processing unit 10 reads out and starts executing the boot program 11a stored in the mask ROM 11 (step S2). The processing unit 10 executing the boot program 11a sets conditions for access restriction to the register group 16 by writing set values for the transmission permission setting registers 1-4, transmission cycle setting registers 1-4, transmission identification information setting registers 1-4, reception permission setting registers 1-4 and reception identification information setting registers 1-4 that are included in the register group 16 in the CAN controller 15 (step S3).

After the condition setting for access restriction is completed, the processing unit 10 executing the boot program 11a writes a value into a mode register included in the register group 16 in the CAN controller 15, to switch the mode from the full control mode to the restriction mode (step S4). After the mode switching in the CAN controller 15 is completed, the processing unit 10 terminates the execution of the boot program 11a, reads out and starts executing the application program 12a stored in the EEPROM 12 (step S5), and terminates the processing at activation.

Figure 4:
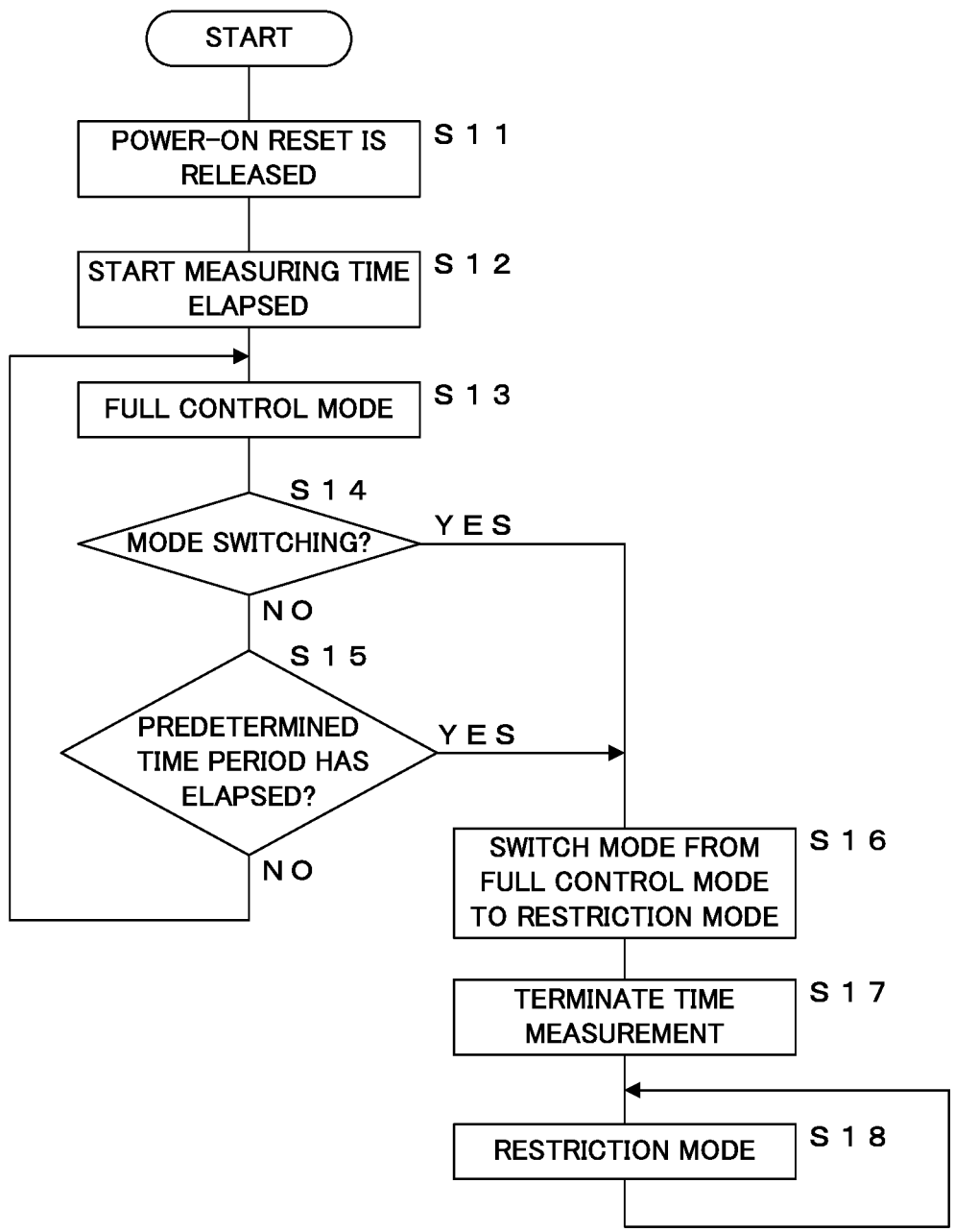
FIG. 4 is a flowchart illustrating a procedure of mode switch processing performed by a CAN controller in an ECU.

FIG. 4 is a flowchart illustrating a procedure of mode switch processing performed by the CAN controller 15 in the ECU 1. By the ECU 1 being activated, reactivated or the like, the CAN controller 15 in the ECU 1 according to the present embodiment performs power-on reset by a reset IC, for example, and thereafter the power-on reset is released (step S11) to start the processing. The CAN controller 15 starts measuring the time elapsed from the activation by an internal timer function or the like (step S12). Moreover, the CAN controller 15 after activation operates in the full control mode (step S13).

The CAN controller 15 determines whether or not an instruction for mode switching is provided from the processing unit 10 based on whether or not a value for switching to the restriction mode is written into a mode register in the register group 16 (step S14). If the instruction for mode switching is not provided (S14: NO), the CAN controller 15 further determines whether or not a predetermined time period has elapsed from the activation when the time measurement is started at step S12 (step S15). If the predetermined time period has not elapsed from the activation (S15: NO), the CAN controller 15 returns the processing to step S13, and continues operation in the full control mode.

If the instruction for mode switching is provided (S14: YES), or if the predetermined time period has elapsed from the activation (S15: YES), the CAN controller 15 switches the mode from the full control mode to the restriction mode (step S16). Furthermore, the CAN controller 15 terminates the time measurement started at step S12 (step S16). Thereafter, the CAN controller 15 continuously performs operation in the restriction mode (step S18).

Figure 5:
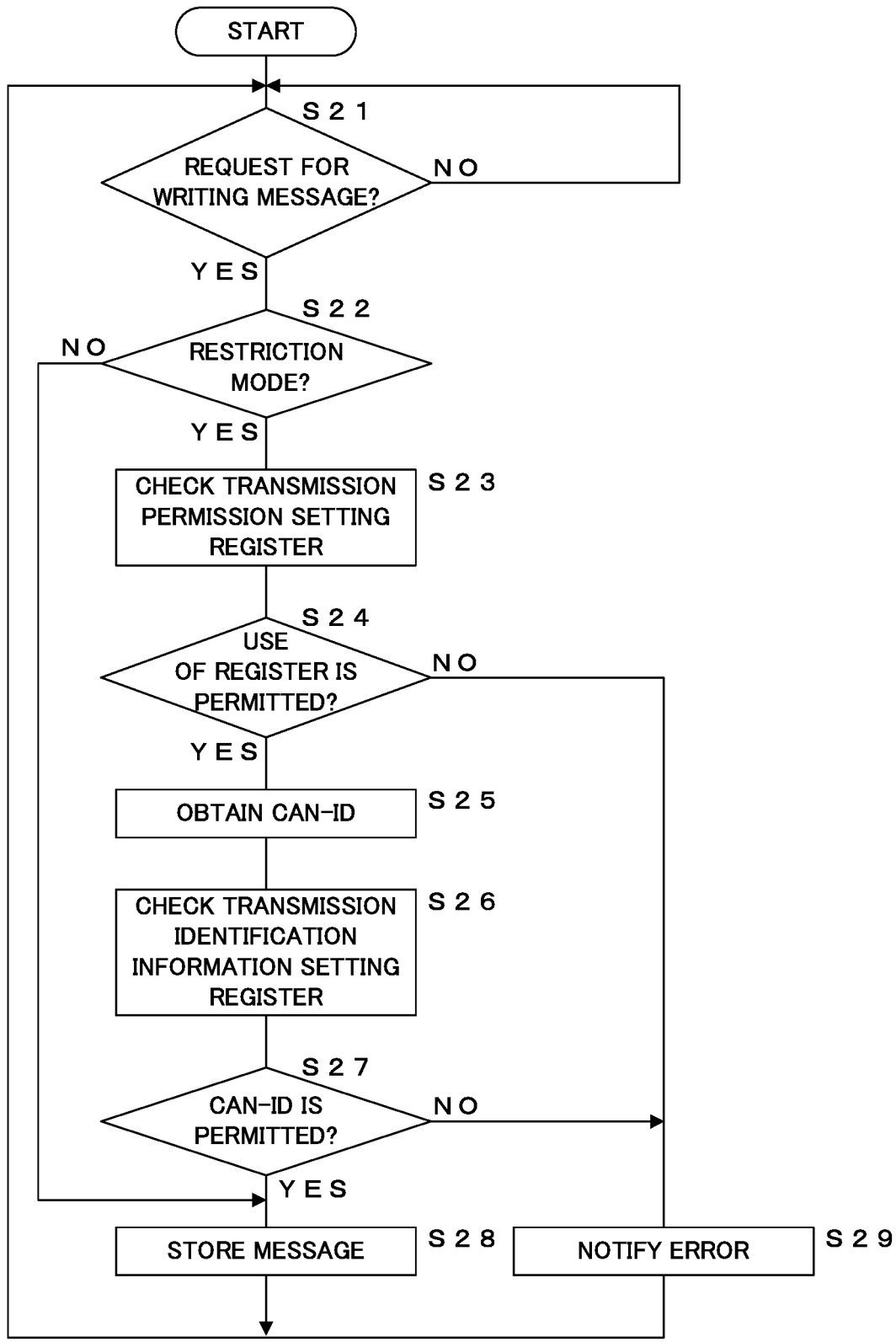
FIG. 5 is a flowchart illustrating a procedure of restriction processing performed by the CAN controller.

FIG. 5 is a flowchart illustrating a procedure of restriction processing at the time of requesting message transmission performed by the CAN controller 15, which is restriction processing based on the CAN-ID. The CAN controller 15 determines whether or not a request for writing a message is sent from the processing unit 10 to any one of the transmission message storing registers 1-4 (step S21). If a request for writing a message is not sent (S21: NO), the CAN controller 15 waits until the request for writing is sent. If the request for writing a message is sent (S21: YES), the CAN controller 15 determines whether or not the operation mode for itself is the restriction mode (step S22).

If the operation mode is the restriction mode (S22: YES), the CAN controller 15 checks a value of one of the transmission permission setting registers 1-4 corresponding to one of the transmission message storing registers 1-4 to which the request for writing is made (step S23). Based on the result obtained at step S23, the CAN controller 15 determines whether or not the use of the one of the transmission message storing registers 1-4 to which the request for writing is made is permitted (step S24). If the use thereof is not permitted (S24: NO), the CAN controller 15 notifies the processing unit 10 of an error (step S29), and returns the processing to step S21.

If the use of the one of the transmission message storing registers 1-4 is permitted (S24: YES), the CAN controller 15 obtains CAN-ID contained in the message sent from the processing unit 10 (step S25). The CAN controller 15 checks the value of one of the transmission identification information setting registers 1-4 corresponding to one of the transmission message storing registers 1-4 to which the request for writing is made (step S26), and determines whether or not the CAN-ID obtained at step S25 is the CAN-ID permitted to be stored in the one of the transmission message storing registers 1-4 (step S27). If the CAN-ID is a permitted one (S27: YES), the CAN controller 15 stores the message sent from the processing unit 10 into the one of the transmission message storing registers 1-4 (step S28), and returns the processing to step S21. If the CAN-ID is not a permitted one (S27: NO), the CAN controller 15 notifies the processing unit 10 of an error (step S29), and returns the processing to step S21.

If the operation mode is not the restriction mode (S22: NO), i.e., if the operation mode is the full control mode, the CAN controller 15 stores the message sent from the processing unit 10 into one of the transmission message storing registers 1-4 (step S28), and returns the processing to step S21.

Figure 6:
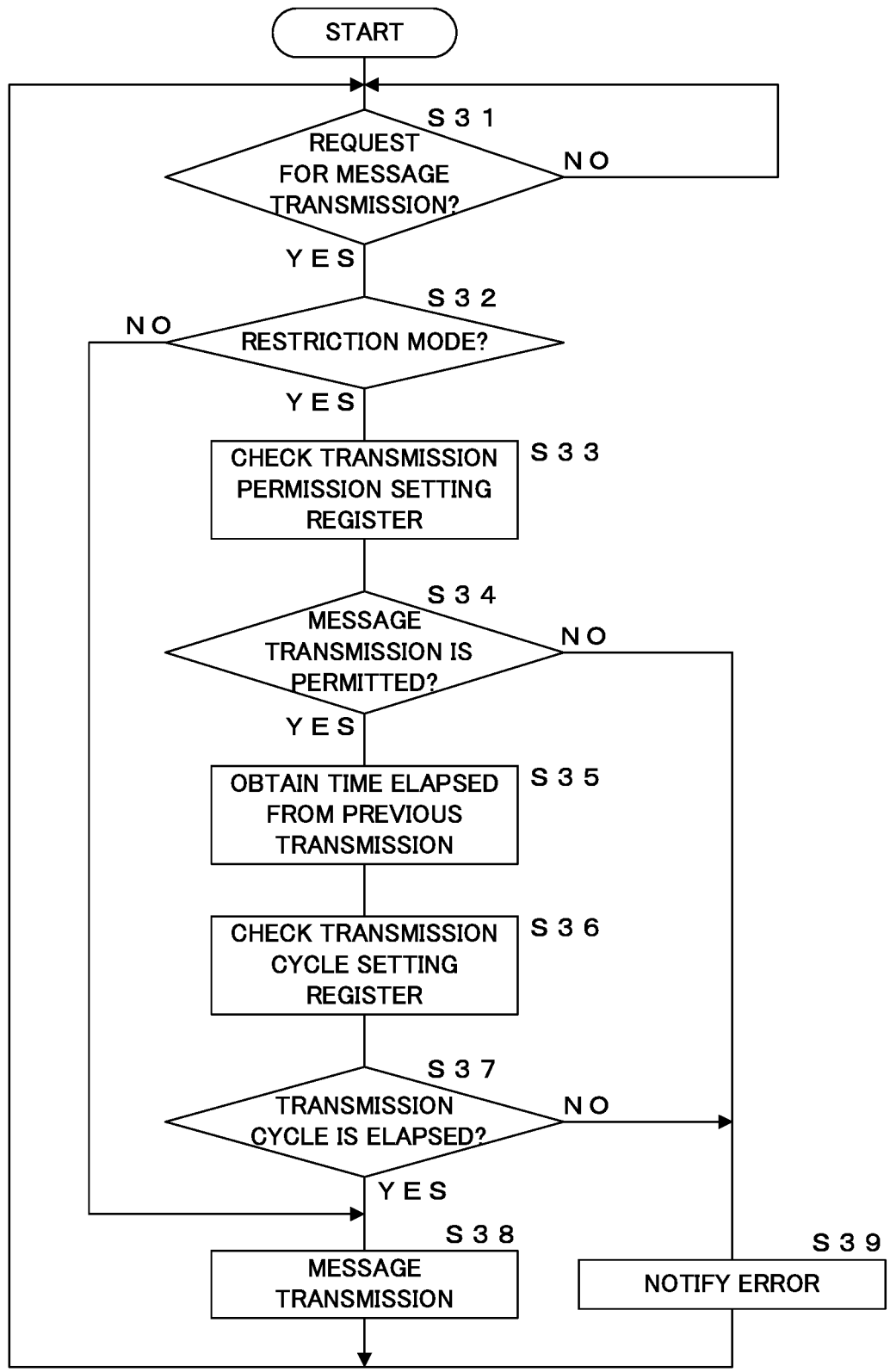
FIG. 6 is a flowchart illustrating a procedure of restriction processing performed by the CAN controller.

FIG. 6 is a flowchart illustrating a procedure of restriction processing at the time of requesting message transmission performed by the CAN controller 15, which is restriction processing based on a transmission cycle. In the case of performing message transmission, the CAN controller 15 uses its timer function to perform processing of measuring the time elapsed from the message transmission. The CAN controller 15 determines whether or not a request for message transmission to a different ECU 1 is sent from the processing unit 10 (step S31). If a transmission request is not sent (S31: NO), the CAN controller 15 waits until the transmission request is sent. If the transmission request is sent (S31: YES), the CAN controller 15 determines whether or not its operation mode is the restriction mode (step S32).

If the operation mode is the restriction mode (S32: YES), the CAN controller 15 checks the value of one of the transmission permission setting registers 1-4 corresponding to one of the transmission request registers 1-4 to which a transmission request is made (step S33). Based on the result obtained at step S33, the CAN controller 15 determines whether or not the message transmission is permitted for the one of the transmission message storing registers 1-4 to which the request is made (step S34). If the message transmission is not permitted (S34: NO), the CAN controller 15 notifies the processing unit 10 of an error (step S39), and returns the processing to step S31.

If the message transmission is permitted (S34: YES), the CAN controller 15 obtains the time elapsed from the previous transmission of a message stored in the corresponding one of the transmission message storing registers 1-4 (step S35). The CAN controller 15 checks the value of one of the transmission cycle setting registers 1-4 corresponding to one of the transmission message storing registers 1-4 to which a transmission request is made (step S36). The CAN controller 15 determines whether or not the time elapsed from the previous transmission obtained at step S35 passes the transmission cycle set for the one of the transmission cycle setting registers 1-4 (step S37). If the transmission cycle has elapsed (S37: YES), the CAN controller 15 reads out a message stored in one of the transmission message storing registers 1-4 corresponding to the transmission request and performs message transmission by outputting the message to the CAN bus 2 (step S38), and returns the processing to step S31. If the transmission cycle has not elapsed (S37: NO), the CAN controller 15 notifies the processing unit 10 of an error (step S39), and returns the processing to step S31.

If the operation mode is not a restriction mode (S32: NO), i.e., if the operation mode is the full control mode, the CAN controller 15 reads out a message stored in one of the transmission message storing registers 1-4 corresponding to the transmission request and performs message transmission by outputting the message to the CAN bus 2 (step S38), and returns the processing to step S31.

Figure 7:
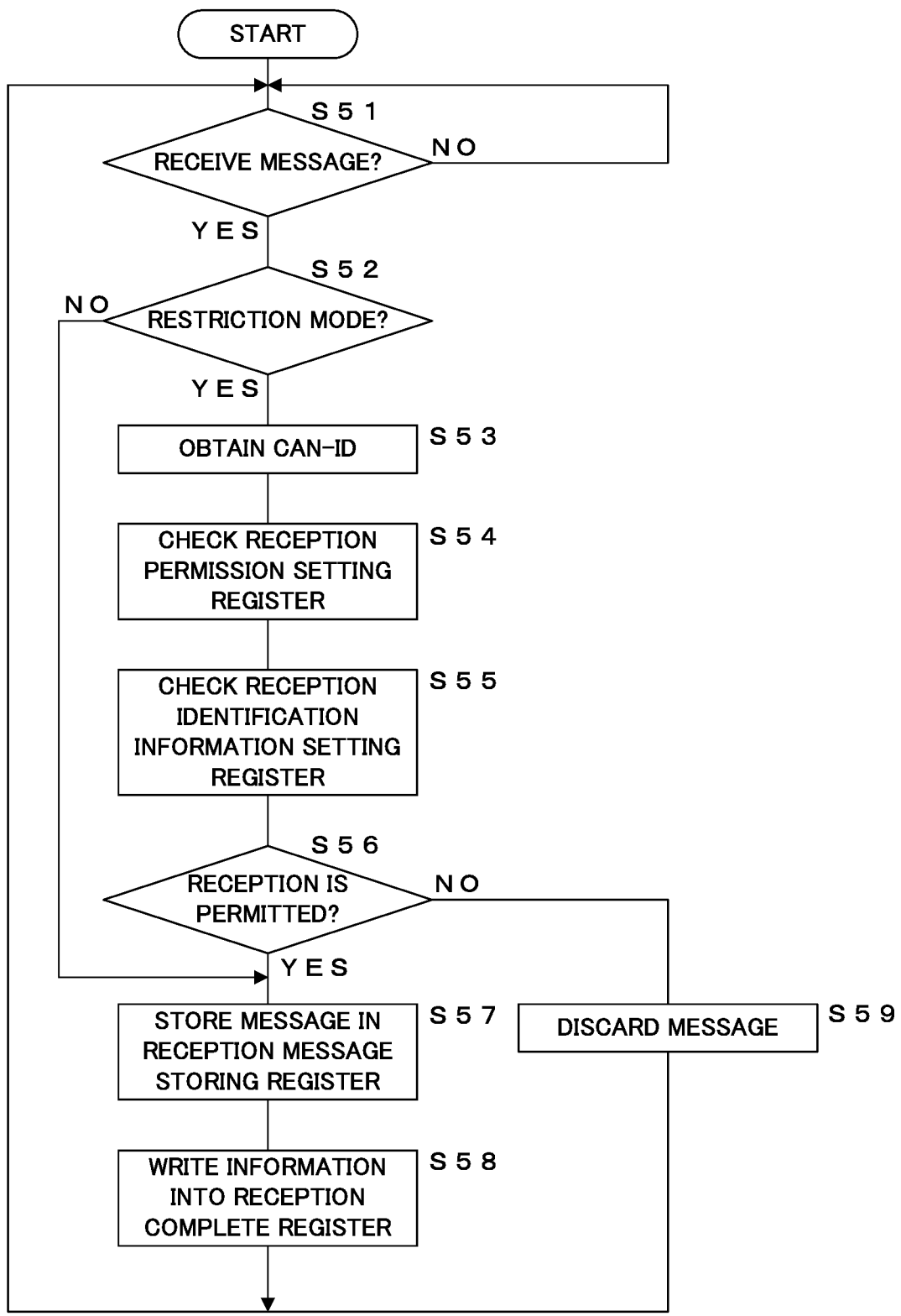
FIG. 7 is a flowchart illustrating a procedure of restriction processing performed by the CAN controller.

FIG. 7 is a flowchart illustrating a procedure of restriction processing at the time of message reception performed by the CAN controller 15, which is restriction processing related to message reception. The CAN controller 15 determines whether or not a message is received from another ECU 1 (step S51). If the message is not received (S51: NO), the CAN controller 15 waits until the message from a different ECU 1 is received. If the message from the different ECU 1 is received (S51: YES), the CAN controller 15 determines whether or not its operation mode is the restriction mode (step S52).

If the operation mode is the restriction mode (S52: YES), the CAN controller 15 obtains a CAN-ID contained in the message received from the different ECU 1 (step S53). Moreover, the CAN controller 15 checks the values of the reception permission setting registers 1-4 in the register group 16 (step S54), while checking the values of the reception identification information setting registers 1-4 (step S55). Based on whether or not the CAN-ID set for one of the reception message storing registers 1-4 that is permitted to be used matches the CAN-ID obtained from the reception message, the CAN controller 15 determines whether or not the reception of this message is permitted (step S56).

If the reception of this message is permitted (S56: YES), the CAN controller 15 stores the message received from the different ECU 1 in one of the reception message storing registers 1-4 for which the CAN-ID of this message is set as the ID for permitting reception (step S57). Subsequently, the CAN controller 15 writes information indicating that reception is completed into one of the reception complete registers 1-4 corresponding to the one of the reception message storing registers 1-4 in which the message is stored (step S58), and returns the processing to step S51. If the reception of this message is not permitted (S56: NO), the CAN controller 15 discards the received message (step S59), and returns the processing to step S51.

Furthermore, if the operation mode is not the restriction mode (S52: NO), i.e., if the operation mode is the full control mode, the CAN controller 15 stores the message received from the different ECU 1 into one of the reception message storing registers 1-4 (step S57), writes the information indicating that the reception is completed into the corresponding one of reception complete registers 1-4 (step S58), and returns the processing to step S51.

The ECU 1 according to the present embodiment having the configuration above comprises the CAN controller 15 having the register group 16 storing therein a value concerning communication with a different ECU 1, and the processing unit 10 performing communication processing by writing and reading a value for the register group 16. The ECU 1 switches the mode between the full control mode (first mode) which allows for writing and reading with respect to the register group 16 in the CAN controller 15 and the restriction mode (second mode) which restricts (prohibits) writing and reading for a part of the registers in the register group 16. The ECU 1 sets a predetermined period from activation as corresponding to the full control mode, and switches the full control mode to the restriction mode after the predetermined period elapses. After switching to the restriction mode, the ECU 1 does not switch the mode to the full control mode.

Accordingly, after the predetermined period elapses from activation of the ECU 1, a state where writing and reading are restricted with respect to a part of the registers in the CAN controller 15 is attained. By restricting the use of a resource related to communication, invalid use of a communication resource based on an invalid program injected into the ECU 1 may be restricted. The ECU 1 according to the present embodiment restricts the use of the register in the CAN controller 15 transmitting/receiving messages to/from a different ECU 1, which can suppress invalid message transmission to the network caused by injecting an invalid program.

Furthermore, the ECU 1 includes a mask ROM 11 (first storage unit) storing therein the boot program 11a (first program) executed by the processing unit 10 after activation, and an EEPROM 12 (second storage unit) storing therein the application program 12a (second program) executed by the processing unit 10 after execution of the boot program 11a. The switching between the full control mode and the restriction mode is performed while a period during which the processing unit 10 executes the boot program 11a is set as the predetermined period described above. That is, the boot program 11a is executed in the full control mode, whereas the application program 12a is executed in the restriction mode. This can limit the operation in the full control mode having no restrictions in the use of the register group 16 in the CAN controller 15 to the execution period of the boot program 11a stored in the mask ROM 11. Even if an invalid program is injected into the EEPROM 12, the invalid program stored in the EEPROM 12 is executed in the restriction mode which restricts the use of the register group 16 in the CAN controller 15.

For the storage unit in which the boot program 11a of the ECU 1 is stored, the mask ROM 11 is used for which the stored content cannot be rewritten. It is impossible to inject an invalid program into the mask ROM 11, preventing the invalid program from being executed in the full control mode.

Moreover, the ECU 1 executes the boot program 11a at the processing unit 10 to perform setting to determine which register is to be restricted from writing and reading in the restriction mode. For example, the ECU 1 writes values into the transmission permission setting registers 1-4, and performs setting to decide which one of the transmission message storing registers 1-4 is available after switching to the restriction mode. Also, for example, the ECU 1 writes values into the reception permission setting registers 1-4, and performs setting to decide which one of the reception message storing registers 1-4 is available after switching to the restriction mode. Accordingly, a register which is restricted from being used in the restriction mode may be set to be suitable for the processing details of its own device. Moreover, the register restricted from being used in the restriction mode may be made variable, so that the versatility of the CAN controller 15 may be enhanced.

The register group 16 in the CAN controller 15 includes four transmission message storing registers 1-4 for storing messages to be transmitted to a different ECU 1. The processing unit 10 may transmit a message by storing the message to be transmitted to the different ECU 1 into one of the transmission message storing registers 1-4. In the restriction mode, writing and reading for one or more of the four transmission message storing registers 1-4 are restricted. This can restrict the use of the transmission message storing registers 1-4 based on an invalid program, and thus can restrict invalid message transmission.

Moreover, the register group 16 in the CAN controller 15 includes transmission cycle setting registers 1-4 storing therein the setting of cycles at which the messages stored in the transmission message storing registers 1-4 are transmitted by the CAN controller 15. The message transmission by the CAN controller 15 is restricted (prohibited) so as not to be performed at a cycle shorter than the cycle set by the transmission cycle setting registers 1-4, and thus may only be performed at a cycle longer than the set cycle. Accordingly, the minimum cycle for the message transmission by the ECU 1 may be defined, which can prevent an invalid program from repeating frequent message transmission at a cycle shorter than the minimum cycle.

Moreover, the register group 16 in the CAN controller 15 includes transmission identification information setting registers 1-4 storing therein setting related to the CAN-IDs of messages permitted to be stored into the transmission message storing registers 1-4. Storing of a message into the transmission message storing registers 1-4 in the CAN controller 15 is limited only to a message attached with the CAN-ID set in any one of the identification information setting registers 1-4, and storing of a message attached with any other CAN-ID is restricted (prohibited). This can restrict the type of a message to be transmitted by the ECU 1 based on the CAN-ID, thereby preventing an invalid program from transmitting a message attached with an invalid CAN-ID.

While the present embodiment describes a configuration where each ECU 1 included in the on-vehicle communication system performs communication according to the CAN protocol, it is not limited thereto. A configuration where each ECU 1 performs communication according to a protocol other than CAN, such as TCP/IP, Ethernet (registered trademark) or FlexRay, for example, may also be employed. While the communication system mounted to a vehicle has been described as an example, the present technique may also be applied to a communication system other than the ones mounted to a vehicle, such as a communication system mounted to a mobile body such as an airplane or a vessel, or a communication system installed in a factory, an office or the like, not limited to the described example.

Though it is preferable for all the ECUs 1 included in the communication system to have a function for restricting the register group 16 illustrated in the present embodiment, an ECU not having such a restriction function may also be included in the communication system. While the ECU 1 is configured to include the mask ROM 11 as a non-rewritable storage unit, it is not limited thereto. For example, an erasable programmable read only memory (EPROM) which can erase data by ultraviolet radiation but cannot electrically rewrite data, or a non-volatile memory element such as an EEPROM or a flash memory which is incapable of rewriting data due to a physical configuration such as fuse disconnection may also be employed in place of the mask ROM 11. Moreover, though the ECU 1 is configured to restrict both transmission and reception of a message in the restriction mode, it is not limited thereto but may also be configured to restrict only the transmission of a message.

Embodiment 2

Figure 8:
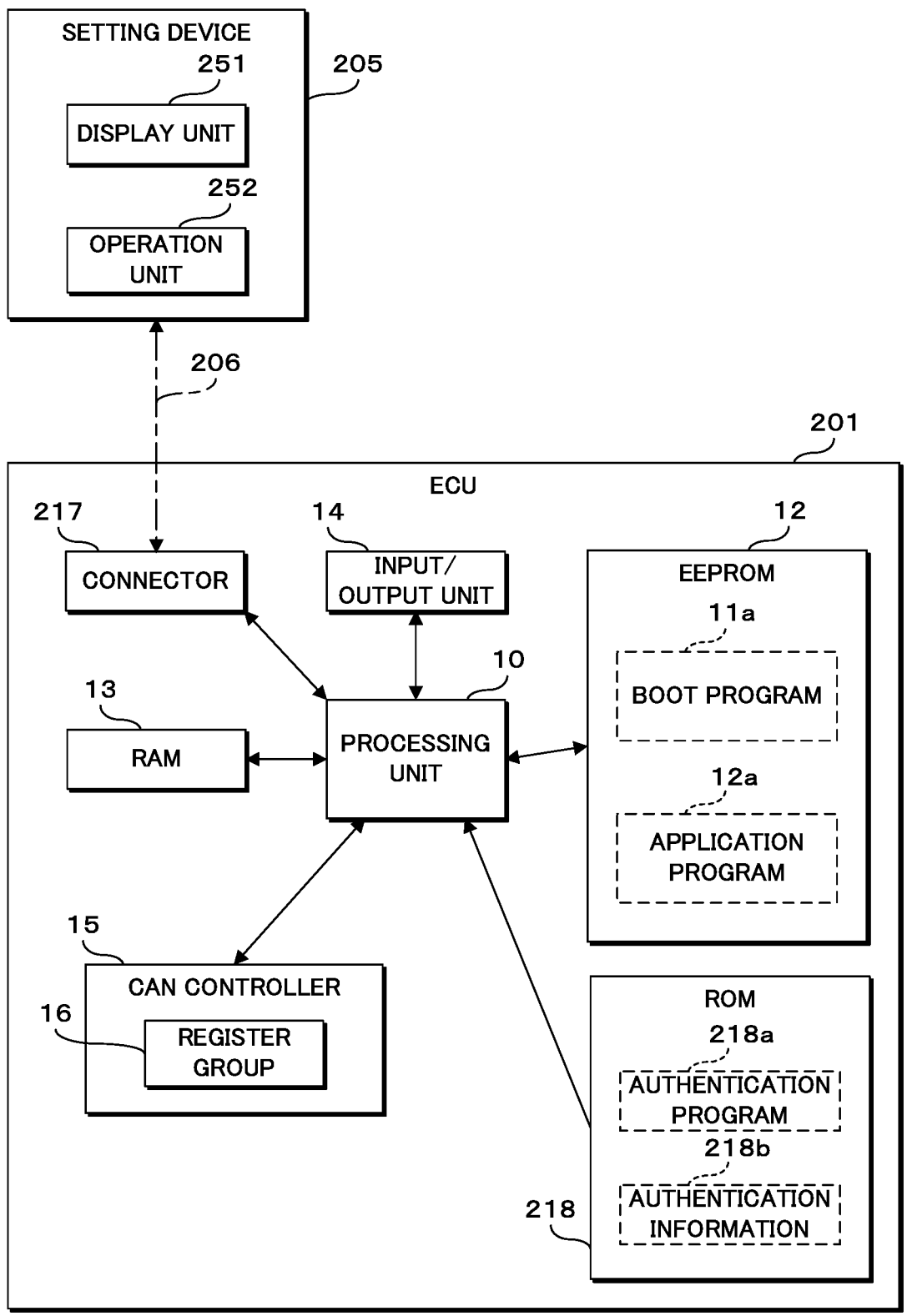
FIG. 8 is a block diagram illustrating the configuration of a communication system according to Embodiment 2.

FIG. 8 is a block diagram illustrating the configuration of a communication system according to Embodiment 2. The other ECUs 1, sensor 3, actuator 4 and the like illustrated in FIG. 1 are not illustrated in FIG. 8. The communication system according to Embodiment 2 comprises a setting device 205 connected to an ECU 201 via a communication line 206. The setting device 205 is a device used when maintenance or checkup is carried out in a car dealer, maintenance factory or the like, for example. By connecting the setting device 205 to the ECU 201, values may be written into the register group 16 in the CAN controller 15. The setting device 205 has a display unit 251 such as a liquid crystal panel, and an operation unit 252 such as a switch or touch panel.

The ECU 201 according to Embodiment 2 is not provided with the mask ROM 11 included in the ECU 1 according to Embodiment 1, and stores the boot program 11*a* in the EEPROM 12. In the EEPROM 12 of the ECU 201, the boot program 11*a*, application program 12*a* and the like may be stored.

Furthermore, the ECU 201 according to Embodiment 2 is provided with a connector 217 for connecting the setting device 205 thereto via the communication line 206. In the case of being connected with the authenticated setting device 205 via the connector 217, the ECU 201 according to Embodiment 2 may write a value into a register for which writing thereto is restricted, in the register group 16 in the CAN controller 15.

Furthermore, the ECU 201 according to Embodiment 2 is provided with a ROM 218. The ROM 218 is configured using a mask ROM, an EEPROM or the like. For the ROM 218, however, data cannot be rewritten at normal operation of the ECU 201, even if the ROM 218 is configured with a data rewritable memory element such as EEPROM, for example. The ROM 218 stores therein an authentication program 218*a*, authentication information 218*b* and so forth. The authentication program 218*a* is a program executed by the processing unit 10 in the case where the setting device 205 is connected to the connector 217, and performs authentication processing for the setting device 205. The authentication information 218*b* is information for the authentication program 218*a* to perform authentication processing for the setting device 205, and is, for example, information such as ID, password and the like of the device.

The ECU 201 according to Embodiment 2 operates in the restriction mode at all times in normal operation. That is, the ECU 201 activated by power input starts operating in the restriction mode after activation, and will not be switched thereafter to the full control mode as long as it operates normally. Thus, the ECU 201 executes the boot program 11*a* and application program 12*a* in the restriction mode, so that no setting process for the register group 16 in the CAN controller 15 is included in the boot program 11*a*. The ECU 201 according to Embodiment 2 may operate the CAN controller 15 in the full control mode only in the case where the setting device 205 is connected to the connector 217.

In the case where the ECU 201 according to Embodiment 2 detects that the setting device 205 is connected to the connector 217, the processing unit 10 reads out the authentication program 218*a* from the ROM 218 and executes the program 218*a* to perform authentication processing between the ECU 201 and the setting device 205. The ECU 201 performs authentication processing based on the authentication information 218*a* stored in the ROM 218, and accepts operation of switching the operation mode of the CAN controller 15 from the restriction mode to the full control mode only in the case where the authentication processing succeeds.

In the case where the authentication processing succeeds, the operator of the setting device 205 may obtain various types of information related to the ECU 201 and display them on the display unit 251, and may perform the operation of various setting changes related to the ECU 201 through the operation unit 252. Moreover, the setting device 205 according to Embodiment 2 may switch the operation mode of the CAN controller 15 in the ECU 201, and may write values into the register group 16 by switching the mode to the full control mode.

In the case where the operation of mode switching is performed for the operation unit 252 in the setting device 205, the operation details are sent to the processing unit 10 in the ECU 201 via the connector 217 from the setting device 205. Accordingly, the processing unit 10 in the ECU 201 accepts switching operation for the mode. In the case of accepting from the setting device 205 the switching operation to the full control mode, the ECU 201 switches the mode from the restriction mode to the full control mode. In the full control mode, the ECU 201 performs communication via the communication line 206 between itself and the setting device 205, accepts a writing request for a value to be written into the register group 16 in the CAN controller 15, and writes the requested value into a register in the register group 16.

Moreover, in the case of accepting from the setting device 205 the switching operation to the restriction mode, the ECU 201 switches the mode from the full control mode to the restriction mode. In the case where, for example, connection of the setting device 205 is released, or the case where a predetermined period of time has elapsed from the switching to the full control mode, the operation mode may be switched automatically from the full control mode to the restriction mode even if switching operation to the restriction mode is not accepted from the setting device 205.

Figure 9:
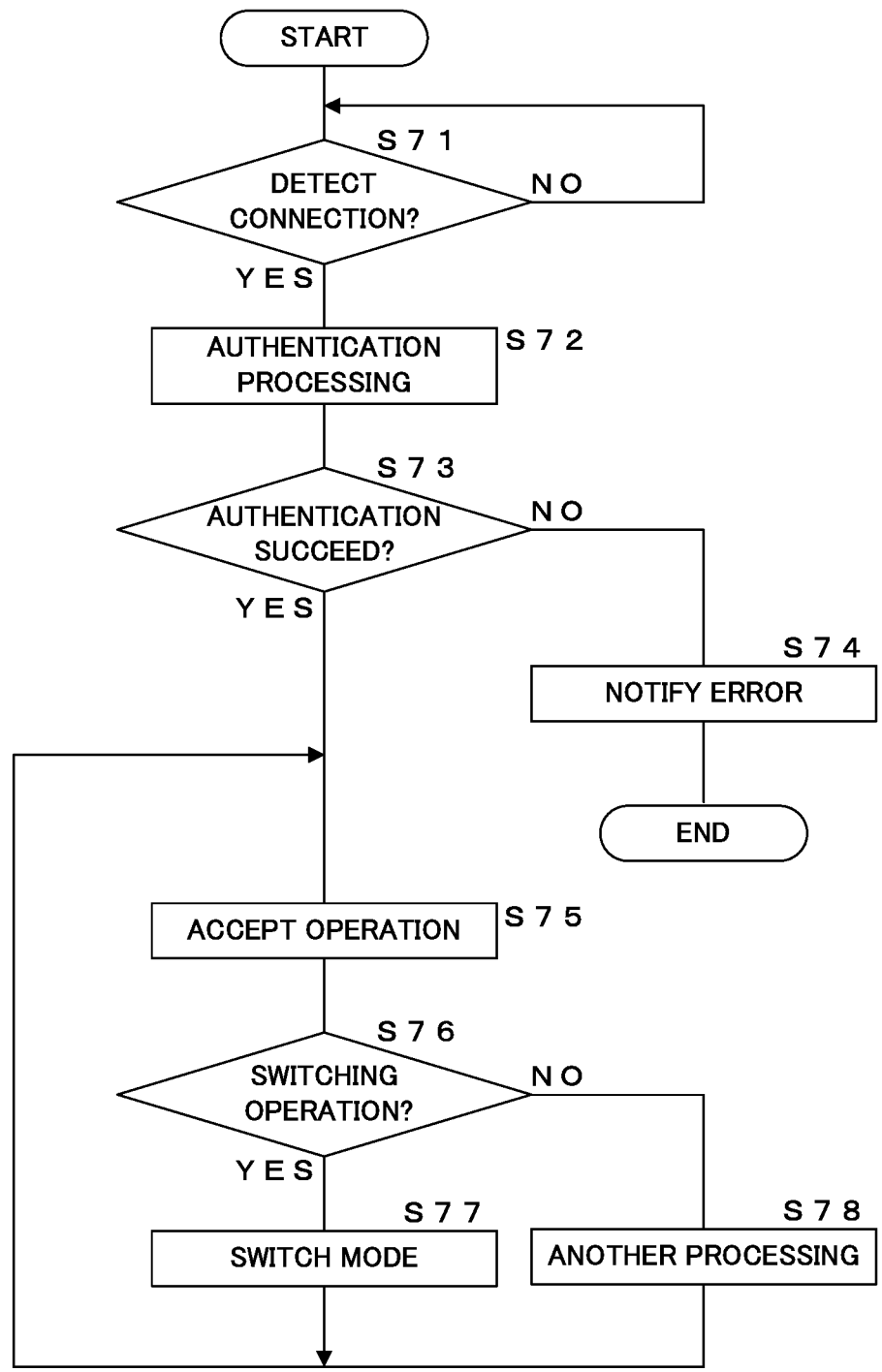
FIG. 9 is a flowchart illustrating a procedure of mode switch processing performed by an ECU according to Embodiment 2.

FIG. 9 is a flowchart illustrating a procedure of mode switch processing performed by the ECU 201 according to Embodiment 2. The processing unit 10 of the ECU 201 according to Embodiment 2 determines whether or not connection of the setting device 205 to the connector 217 is detected (step S71). If the connection is not detected (S71: NO), the processing unit 10 waits until the connection is detected.

If the connection of the setting device 205 is detected (S71: YES), the processing unit 10 executes the authentication program 218a stored in the ROM 218, and performs authentication processing with the setting device 205 using authentication information 218b stored in the ROM 218 (step S72). The processing unit 10 determines whether or not the authentication processing succeeds (step S73). If the authentication processing fails (S73: NO), the processing unit 10 notifies the setting device 205 of an error (step S74), and terminates the processing.

If the authentication processing succeeds (S73: YES), the processing unit 10 detects the presence/absence of operation for the operation unit 252 in the setting device 205, to accept the operation (step S75). The processing unit 10 determines whether or not the accepted operation is the switching operation for the operation mode (step S76). If it is the switching operation (S76: YES), the processing unit 10 switches the mode from the restriction mode to the full control mode or from the full control mode to the restriction mode in accordance with the accepted operation details (step S77), and returns the processing to step S75. If the accepted operation is not the switching operation (S76: NO), the processing unit 10 performs another processing in accordance with the accepted operation details, such as writing a value into the register group 16 in the CAN controller 15 for example (step S78), and returns the processing to step S75.

The ECU 201 according to Embodiment 2 with the configuration described above switches the mode from the restriction mode to the full control mode in the case where explicit mode switching operation is performed. This allows for writing a value into the register group 16 in the CAN controller 15 at the time of testing, manufacturing, maintenance or the like of a vehicle, for example.

Furthermore, the ECU 201 is provided with a connector 217 for connecting the setting device 205 thereto via the communication line 206. The setting device 205 includes the operation unit 252 which performs operation related to mode switching in the ECU 201. The ECU 201 accepts the operation performed at the operation unit 252 in the setting device 205 via the connector 217, and performs mode switching in accordance with the accepted operation.

Moreover, the ECU 201 performs authentication processing between itself and the setting device 205 connected to the connector 217. The ECU 201 accepts operation concerning mode switching only when the authentication processing succeeds. This makes it more difficult to rewrite a value for the register group 16 in the CAN controller 15 that employs an external device connected to the connector 217.

While the ECU 201 according to Embodiment 2 is not provided with the mask ROM 11 and stores the boot program 11a in the EEPROM 12, the configuration is not limited thereto. The ECU 201 may also be configured to include the mask ROM in which the boot program 11a is stored as in the ECU 1 according to Embodiment 1. In this configuration, the ECU 201 may be configured to perform both the mode switching after a predetermined period has elapsed from the activation described in Embodiment 1 and the mode switching based on the switching operation by the setting device 205 described in Embodiment 2.

Furthermore, the ECU 201 may also be configured to perform authentication processing in accordance with detection of connection to the setting device 205, and automatically switches the operation mode from the restriction mode to the full control mode if the authentication processing succeeds. In this configuration, the operation of connecting the setting device 205 to the ECU 201 corresponds to explicit operation for mode switching. The program which accepts the mode switching operation after the authentication processing may be the authentication program 218a, or may be a program other than the authentication program 218a. However, the program for accepting the mode switching operation to perform mode switching may preferably be stored in the ROM 218.

Furthermore, though the ECU 201 is configured to connect the setting device 205 to the connector 217 via the communication line 206, the configuration is not limited thereto. For example, the ECU 201 may be configured to perform wireless communication between itself and the setting device 205. Moreover, for example, instead of connecting the setting device 205 thereto, the ECU 201 may be provided with an operation unit to accept the operation of mode switching.

Since the other configuration parts in the communication system according to Embodiment 2 are similar to those in the communication system according to Embodiment 1, like parts are denoted by the same reference codes and will not be described in detail.

It is to be noted that, as used herein and in the appended claims, the singular forms "a", "an", and "the" include plural referents unless the context clearly dictates otherwise.

It is to be noted that the disclosed embodiment is illustrative and not restrictive in all aspects. The scope of the present invention is defined by the appended claims rather than by the description preceding them, and all changes that fall within metes and bounds of the claims, or equivalence of such metes and bounds thereof are therefore intended to be embraced by the claims.

The invention claimed is:

1. A communication device, comprising a communication unit having a plurality of registers in which a value concerning communication with a different device is stored, and a processing unit performing communication processing by writing and reading the value for the registers in the communication unit, wherein
  writing or reading of the value is restricted for a part of the plurality of registers, and
  the communication device further comprises a switching unit for performing switching between a first mode in which writing and reading of the value for the plurality of registers are allowed and a second mode in which writing or reading of the value for a part of the plurality of registers is restricted.

2. The communication device according to claim 1, wherein
  the switching unit is configured not to perform switching from the second mode to the first mode after performing switching from the first mode to the second mode.

3. The communication device according to claim 1, wherein
  the switching unit is configured to set in the first mode for a predetermined period from activation of the communication device, to perform switching from the first mode to the second mode after the predetermined period elapses, and not to perform switching from the second mode to the first mode after the switching from the first mode to the second mode.

4. The communication device according to claim 3, further comprising a storage unit in which a program for writing the value into a register restricted from writing in the second mode is stored, wherein
  the processing unit executes the program after activation of the communication device, and
  the switching unit is configured to perform switching while setting a period during which the program is executed by the processing unit as the predetermined period.

5. The communication device according to claim 1, wherein
  the plurality of registers include a plurality of transmission message storing registers in which a message to be transmitted by the communication unit to a different device is stored, and
  writing is restricted for one or more of the transmission message storing registers of the plurality of transmission message storing registers in the second mode.

6. The communication device according to claim 5, wherein
  the plurality of registers include a transmission cycle setting register for storing setting of a cycle at which the communication unit transmits a message stored in the transmission message storing register, and
  the communication device further comprises a regulation unit regulating message transmission at a cycle shorter than the cycle set and stored in the transmission cycle setting register.

7. The communication device according to claim 5, wherein
  the message contains identification information for identifying the message,
  the plurality of registers include an identification information setting register for storing setting for the identification information permitting storage into the transmission message storing register, and
  the communication device further comprises a restriction unit restricting storage of a message other than identification information stored in the identification information setting register into the transmission message storing register.

8. The communication device according to claim 1, further comprising an operation accepting unit accepting operation concerning switching between the first mode and the second mode, wherein
  the switching unit is configured to perform switching in accordance with the operation accepted by the operation accepting unit.

9. The communication device according to claim 8, further comprising a connection unit to be connected with an external device, wherein
  the operation accepting unit is configured to accept, via the connection unit, operation performed for the external device connected with the connection unit.

10. The communication device according to claim 9, further comprising an authentication processing unit performing authentication processing between the authentication processing unit and an external device connected with the connection unit,
  wherein the operation accepting unit is configured to accept operation in a case where the authentication processing by the authentication processing unit succeeds.

11. A communication device, comprising a communication unit having a plurality of registers in which a value concerning communication with a different device is stored; and a processing unit performing communication processing by writing and reading the value for the registers in the communication unit, further comprising
  a switching unit performing switching between a first mode in which writing and reading of the value for the plurality of registers are allowed and a second mode in which writing or reading of the value for a part of the plurality of registers are restricted,
  wherein the processing unit is configured to write the value into a register restricted from writing in the second mode, and to cause the switching unit to perform switching from the first mode to the second mode after writing of the value into the register.

12. A non-transitory recording medium in which a communication restriction program is recorded, the communication restriction program causing a communication device, comprising: a communication unit having a plurality of registers in which a value concerning communication with a different device is stored; a processing unit performing communication processing by writing and reading the value for the registers in the communication unit; and a switching unit switching between a first mode in which writing and reading of the value for the plurality of registers are allowed and a second mode in which writing or reading of the value for a part of the plurality of registers is restricted, to:
  write the value into a register restricted from writing in the second mode; and
  cause the switching unit to perform switching from the first mode to the second mode after writing the value into the register.

* * * * *